R. HELM.
WATER TUBE STEAM GENERATOR.
APPLICATION FILED JUNE 13, 1912.

1,046,387.

Patented Dec. 3, 1912.

Witnesses:
Charles B Crompton.
Fred Pohl.

Inventor:
Richard Helm
by:
Croydon Marks
Attorney.

UNITED STATES PATENT OFFICE.

RICHARD HELM, OF STEGLITZ, NEAR BERLIN, GERMANY.

WATER-TUBE STEAM-GENERATOR.

1,046,387.    Specification of Letters Patent.    Patented Dec. 3, 1912.

Application filed June 13, 1912. Serial No. 703,466.

*To all whom it may concern:*

Be it known that I, RICHARD HELM, a subject of the King of Prussia, and resident of 60 Holsteinischestrasse, Steglitz, near Berlin, Germany, have invented new and useful Improvements in Water-Tube Steam-Generators, of which the following is a specification.

This invention relates to water tube steam generators in which an upper water drum is connected to sets of curved tubes, each set consisting of a pair of groups of tubes connected to two or more lower water drums arranged one above another on both sides of the furnace.

The object of the present invention is to more fully utilize the lower water drums for heating purposes and to enable the furnace grate to be arranged as far as possible over the whole available width of the furnace and also to provide a heating surface corresponding to the increased width of the fire-grate without increasing the dimensions of the furnace.

According to the present invention the more elevated drums of the lower water drums, together with their groups of water tubes, are inclosed over the whole length of the furnace within the groups of water tubes connected to the lowermost water drums. By this means the inclosed lower water drums are heated, while by boxing-in or inclosing the one group of tubes, it is possible to cause the furnace gases to pass in an alternating direction through and between the water tubes and thus insure uniform heating of the water tubes over their whole length and cause the furnace gases to completely surround the inclosed lower water drums. Furthermore it is possible to increase the width of the furnace grate as two small lower water drums, limiting the width of the furnace grate and only just large enough for a man to creep through, can be used and still sufficient water tubes provided by inclosing the more elevated lower water drums.

In order that the invention may be more clearly understood, reference is made to the accompanying drawings which illustrate by way of example two methods of carrying out the invention.

Figure 1:
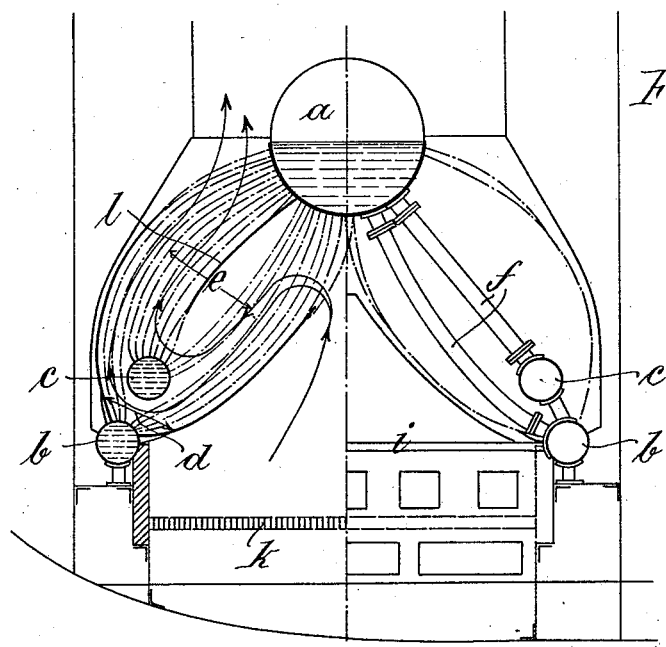
Figure 2:
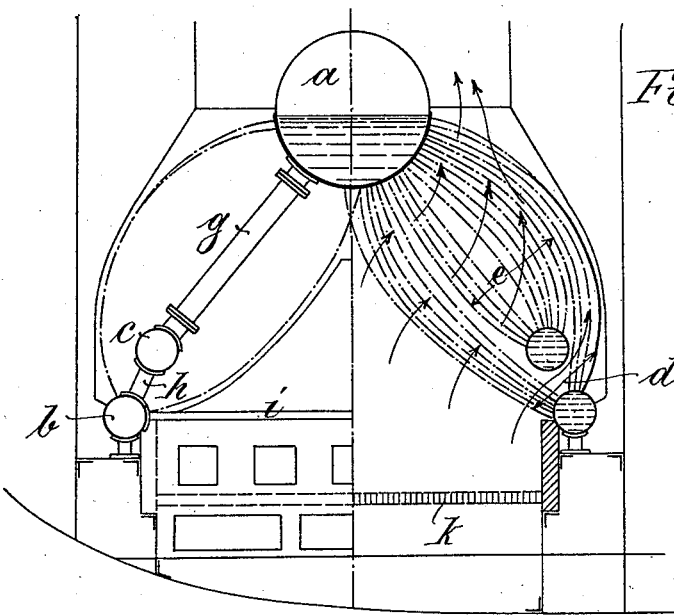

Figure 1 is a view half in section and half in elevation of one form of steam generator according to the present invention and Fig. 2 is a similar view of a slightly modified form of Fig. 1.

The steam generator comprises an upper water drum $a$, two lower water drums $b$ and more elevated lower water drums $c$, the lower water drums being connected to the upper water drums by groups of curved water tubes $d$ and $e$ respectively.

An energetic water circulation is maintained by means of fall pipes $f$, (Fig. 1) or fall pipes $g$, $h$, (Fig. 2,) arranged in front of and behind the steam generator. Transverse anchor plates $i$ arranged at the front and rear of the steam generator, prevent the lower water drums from lateral displacement. Beneath and between the groups of water tubes is arranged the furnace grate $k$. The hot gases are directed either in an alternating or upward and downward direction by means of deflectors $l$ as indicated in Fig. 1, or directly through and between the water tubes as indicated in Fig. 2 in such a manner that the whole of the water tubes and water drums are surrounded as completely as possible by the furnace gases. It is obvious that in both arrangements the groups of water tubes can be heated over their whole length as well as the water drums $c$ which are inclosed by the outer groups of tubes $d$.

In the arrangement illustrated in Fig. 1 the inclosed water drums $c$ are uniformly surrounded by the hot gases while by directing the gases in an alternating direction, the gases are brought into contact with the extreme outer ends of the water tubes.

I claim:—

1. In a steam generator, an upper water drum, lower water drums on each side of the furnace, groups of water tubes connecting said upper and lower water drums, lowermost water drums on both sides of the furnace and below said lower water drums and groups of water tubes connecting said upper drum and lowermost water drums and inclosing said lower water drums and the other groups of tubes.

2. In a steam generator, an upper water drum, lower water drums on each side of the furnace, groups of water tubes connecting said upper and lower water drums, lowermost water drums on both sides of the furnace and below said lower water drums and groups of water tubes connecting said upper drum, lowermost water drums and inclosing said lower water drums and the other groups of tubes, and means for causing the furnace gases to pass in an alternating path between said water tubes.

3. In a steam generator, an upper water drum, lower water drums on each side of the furnace, groups of water tubes connecting said upper and lower water drums, lowermost water drums on both sides of the furnace and below said lower water drums, groups of water tubes connecting said upper drum and lowermost water drums and inclosing said lower water drums and the other groups of tubes, and deflectors intermediate said water tubes and projecting downwardly and outwardly from said upper water drums some distance toward said lower water drums.

In witness whereof I have hereunto set my hand in the presence of two witnesses.

RICHARD HELM.

Witnesses:
HENRY HASPER,
WOLDEMAR HAUPT.

Copies of this patent may be obtained for five cents each, by addressing the "Commissioner of Patents, Washington, D. C."